United States Patent
Fukui et al.

(10) Patent No.: US 9,322,206 B2
(45) Date of Patent: Apr. 26, 2016

(54) CONTROL DEVICE AND VEHICLE CONTROL SYSTEM

(71) Applicant: AISIN SEIKI KABUSHIKI KAISHA, Kariya-shi (JP)

(72) Inventors: Norio Fukui, Kuwana (JP); Hiroki Kino, Chita-gun (JP); Hitoshi Takayanagi, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/613,737

(22) Filed: Feb. 4, 2015

(65) Prior Publication Data

US 2015/0218870 A1    Aug. 6, 2015

(30) Foreign Application Priority Data

Feb. 6, 2014  (JP) ................................ 2014-020861

(51) Int. Cl.
   *B60R 25/20*    (2013.01)
   *E05F 15/76*    (2015.01)

(52) U.S. Cl.
   CPC ................ *E05F 15/76* (2015.01); *B60R 25/20* (2013.01); *B60R 25/2045* (2013.01); *B60Q 2400/40* (2013.01)

(58) Field of Classification Search
   CPC .... E05F 15/73; E05F 15/659; B60R 25/2045; B60R 25/20
   See application file for complete search history.

(56) References Cited

U.S. PATENT DOCUMENTS

| | | | | |
|---|---|---|---|---|
| 2005/0001633 A1* | 1/2005 | Okushima | ............ | H03K 17/962 324/658 |
| 2005/0270177 A1* | 12/2005 | Mori | ......................... | B60T 7/12 340/932.2 |
| 2005/0285717 A1* | 12/2005 | Ieda | ..................... | B60Q 1/2669 340/5.72 |
| 2006/0083406 A1* | 4/2006 | Ishimura | ................. | B60R 25/24 382/106 |
| 2008/0238135 A1* | 10/2008 | Takeda | .................... | B60R 25/24 296/146.4 |

FOREIGN PATENT DOCUMENTS

| | | | | |
|---|---|---|---|---|
| DE | WO 2006024399 A1 | * | 3/2006 | .......... B60R 25/2036 |
| DE | 10 2005 032 402 B3 | | 9/2006 | |
| DE | 10 2008 021 989 A1 | | 12/2008 | |
| EP | 2 860 718 A1 | | 4/2015 | |
| JP | 4624001 | | 2/2011 | |
| JP | 2014-9470 A | | 1/2014 | |
| WO | WO 2014/023405 A1 | | 2/2014 | |

OTHER PUBLICATIONS

Extended European Search Report issued Jul. 20, 2015 in European Patent Application No. 15153795.8.
U.S. Appl. No. 14/613,709, filed Feb. 4, 2015, Fukui, et al.

* cited by examiner

*Primary Examiner* — Rodney Butler
(74) *Attorney, Agent, or Firm* — Oblon, McClelland, Maier & Neustadt, L.L.P.

(57) ABSTRACT

A control device includes: an input section to which a first signal indicating the presence or absence of an operation for operating an opening and closing body of a vehicle which is performed using a portion of the body of an occupant is input from an operation detecting unit; and a control section which performs notification to the occupant using a notification unit when there is a state where the operation has been detected by the operation detecting unit, based on the first signal, and performs control for operating the opening and closing body, based on the operation.

8 Claims, 9 Drawing Sheets

CONTROL DEVICE AND VEHICLE CONTROL SYSTEM

CROSS REFERENCE TO RELATED APPLICATIONS

This application is based on and claims priority under 35 U.S.C, §119 to Japanese Patent Application 2014-020861, filed on Feb. 6, 2014, the entire contents of which are incorporated herein by reference.

TECHNICAL FIELD

This disclosure relates to a control device and a vehicle control system.

BACKGROUND DISCUSSION

Recently, a door opening and shutting device for a vehicle which can open and shut a door of the vehicle according to the intention of an occupant without the occupant touching the door has been proposed (Japanese Patent No. 4524001 (Reference 1)).

In the proposed door opening and shutting device for a vehicle, measuring means is provided in the vicinity of the door of the vehicle, the distance between the door of the vehicle and the hand of the occupant is measured by the measuring means, and opening and shutting drive of the door is performed.

However, in the proposed door opening and shutting device for a vehicle, there may be a case where the door cannot be opened and shut as intended by the occupant. For example, in a case where the hand of the occupant is located at a boundary portion of a measuring area, an operation becomes unstable, and thus the door cannot be opened and shut as intended by the occupant.

SUMMARY

Thus, a need exists for a control device and a vehicle control system which are not suspectable to the drawback mentioned above.

An aspect of this disclosure is directed to a control device including: an input section to which a first signal indicating the presence or absence of an operation for operating an opening and closing body of a vehicle which is performed using a portion of the body of an occupant is input from an operation detecting unit; and a control section which performs notification to the occupant using a notification unit when there is a state where the operation has been detected by the operation detecting unit, based on the first signal, and performs control for operating the opening and closing body, based on the operation.

Another aspect of this disclosure is directed to a vehicle control system including: an operation detecting unit configured to detect an operation for operating an opening and closing body of a vehicle which is performed using a portion of the body of an occupant; a notification unit configured to perform notification to the occupant; and a control device which performs notification to the occupant using the notification unit when there is a state where the operation has been detected by the operation detecting unit, based on a first signal from the operation detecting unit, and operates the opening and closing body based on the operation.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
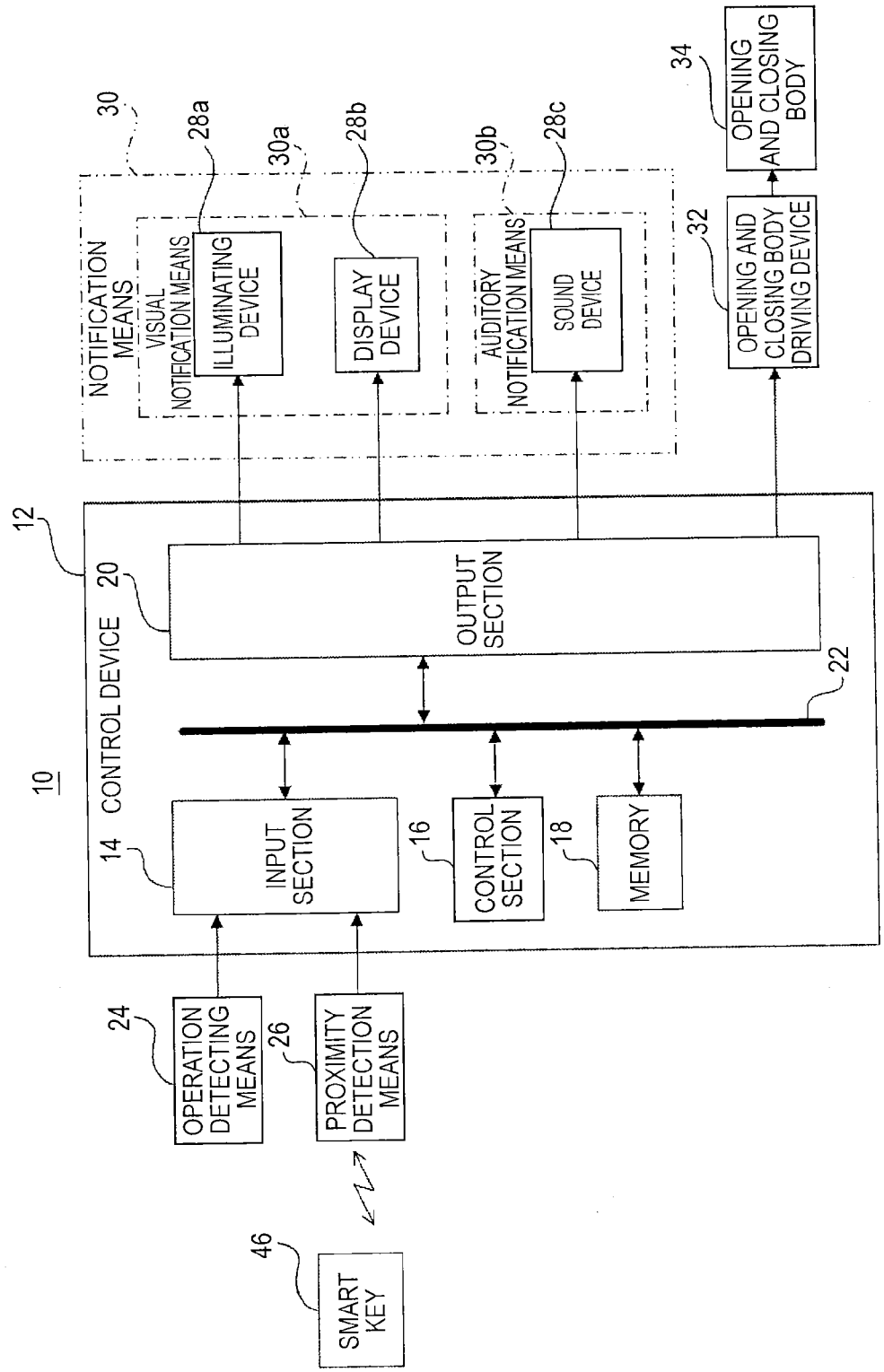
FIG. 1 is a block diagram showing a vehicle control system according to an embodiment.

Hereinafter, an embodiment disclosed here will be described using the drawings. In addition, this disclosure is not limited to the following embodiment and can be appropriately modified within a scope which does not depart from the gist thereof. Further, in the drawings which are described below, elements having the same function are denoted by the same reference numerals and description thereof is sometimes omitted or simplified.

Embodiment

Figure 2:
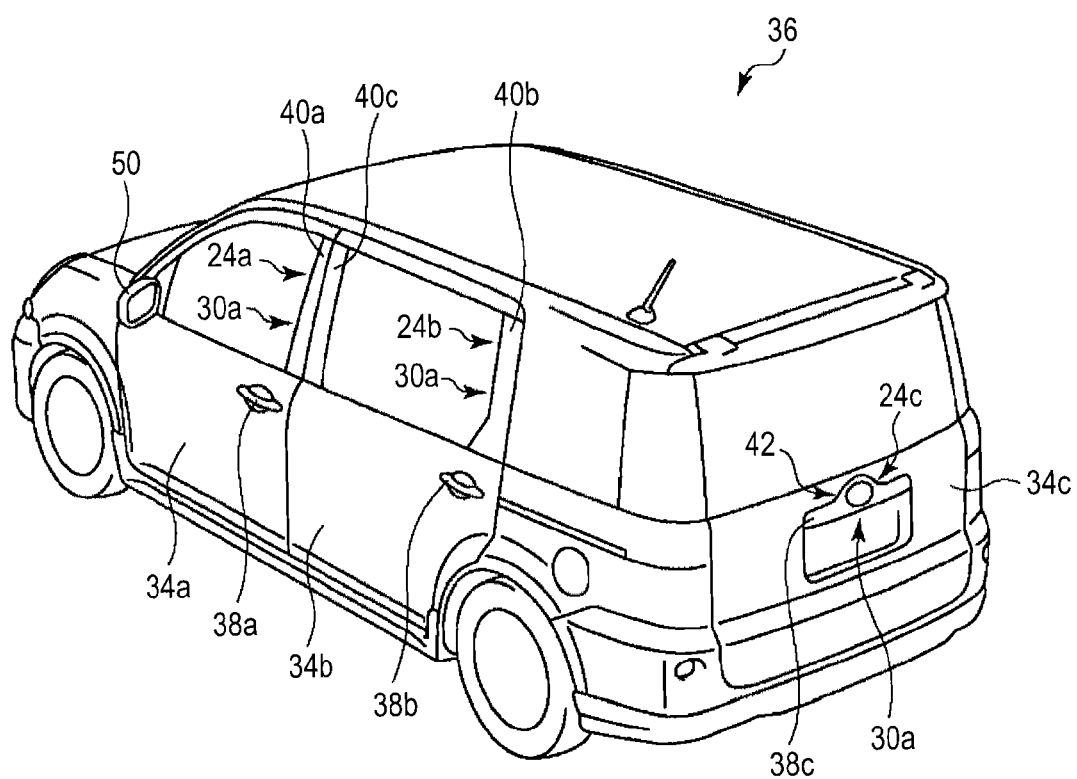
FIG. 2 is a perspective view showing a vehicle according to the embodiment.
Figure 3:
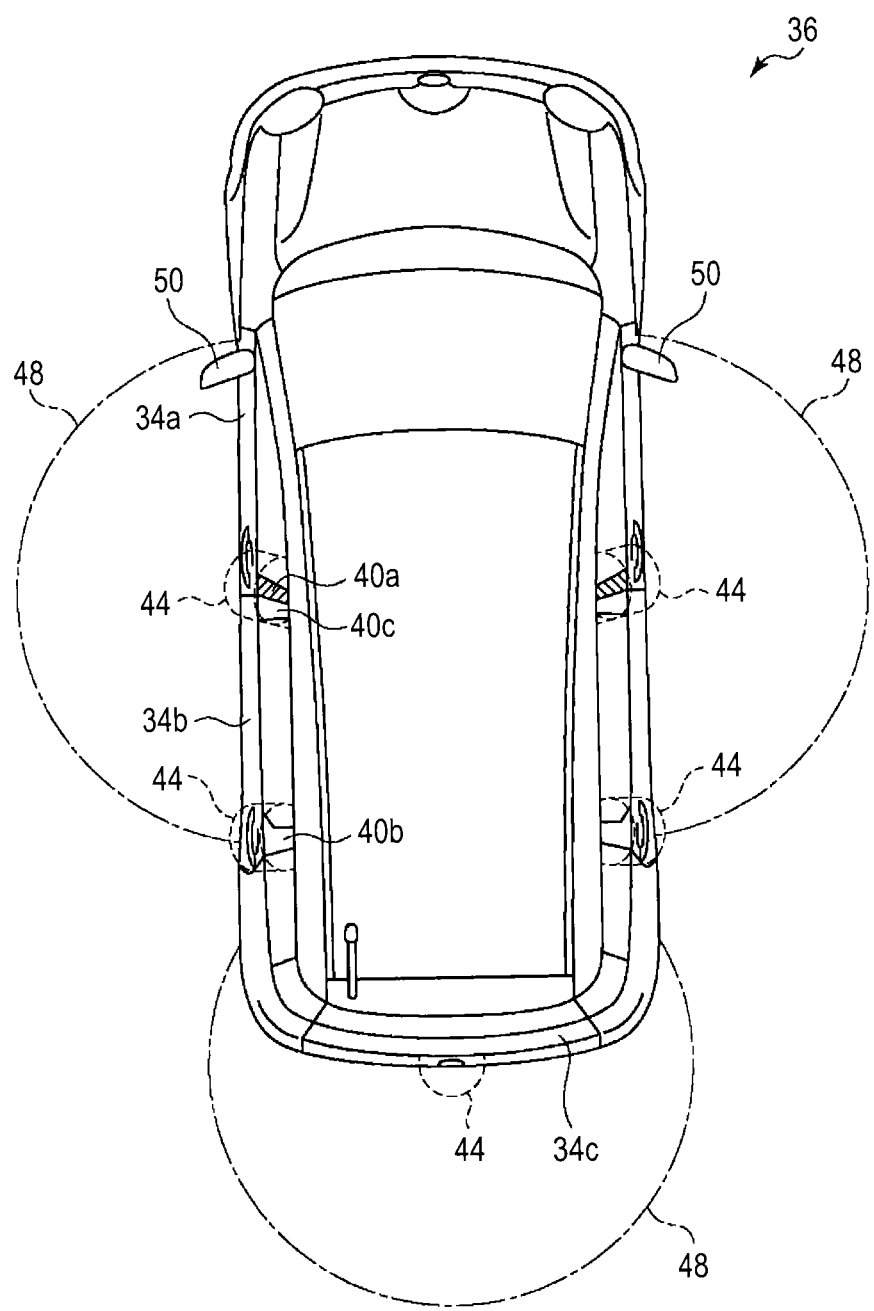
FIG. 3 is a plan view showing the vehicle according to the embodiment.

A control device according to an embodiment, a vehicle control system using the control device, and a vehicle control method using the control device will be described using FIGS. 1 to 8. FIG. 1 is a block diagram showing a vehicle control system according to this embodiment. FIG. 2 is a perspective view showing a vehicle according to this embodiment. FIG. 3 is a plan view showing the vehicle according to this embodiment.

A vehicle control system 10 according to this embodiment has a control device 12. The control device 12 has an input section 14, a control section (a central processing unit (CPU)) 16, a memory 18, and an output section 20. The input section 14, the control section 16, the memory 18, and the output section 20 can input and output signals from and to each other through a bus line 22.

A signal from an operation detecting unit 24 is input to the input section 14. A signal indicating the presence or absence of an operation for operating an opening and closing body (a door) 34 of a vehicle 36 (refer to FIG. 2) which is performed using a portion of the body of an occupant (a user), that is, an operation detection signal, is input from the operation detecting unit 24 to the input section 14.

As the operation for operating the opening and closing body 34 of the vehicle 36 which is performed using a portion of the body of an occupant, a motion in which the occupant puts a hand on a site at which the operation detecting unit 24 is disposed such that the hand of the occupant is located in an operation detection area 44 (refer to FIG. 3) of the operation detecting unit 24, or the like can be given as an example.

In addition, the operation detecting unit 24 is provided at each site on the vehicle 36. However, in FIG. 1, one among a plurality of operation detecting unit 24 is shown.

As the operation detecting unit 24, for example, a proximity sensor or the like can be used. As such a proximity sensor, for example, a capacitance type proximity sensor or the like can be used.

A signal from a proximity detection unit 26 is input to the input section 14. A signal indicating the presence or absence of the proximity of the occupant to the vehicle 36, that is, a proximity detection signal, is input from the proximity detection unit 26 to the input section 14.

As the proximity detection unit 26, for example, a receiving unit capable of receiving a radio signal which is transmitted from a smart key (an authentication key) 46, or the like can be used. The proximity detection unit 26 may also serve as, for example, a receiving unit for a smart key system and may also be provided separately from the receiving unit for a smart key system. That is, it is favorable if when the smart key 46 is located in a communication area 48 of the smart key system, a signal indicating that the smart key 46 is located in the communication area 48 is input to the input section 14. If the signal indicating that the smart key 46 is located in the communication area 48 is input to the input section 14, the control section 16 can determine that there is a state where an occupant carrying the smart key 46 has come close to the vehicle 36.

The control section 16 controls the entire control device 12. The control section 16 reads the proximity detection signal which is input from the proximity detection unit 26 through the input section 14. Further, the control section 16 reads the operation detection signal which is input from the operation detecting unit 24 through the input section 14.

The control section 16 outputs a control signal for driving an illuminating device 28a to the illuminating device 28a through the output section 20. Further, the control section 16 outputs a control signal for driving a display device 28b to the display device 28b through the output section 20. Further, the control section 16 outputs a control signal for driving a sound device 28c to the sound device 28c through the output section 20.

A visual notification unit (visual informing unit) 30a for performing notification (informing) to the occupant through the visual sense of the occupant is configured with the illuminating device 28a and the display device 28b. An auditory notification unit (auditory informing unit) 30b for performing notification (informing) to the occupant through the auditory sense of the occupant is configured with the sound device 28c. A notification unit 30 is configured with the visual notification unit 30a and the auditory notification unit 30b.

In addition, here, a case where the notification unit 30 is configured with the visual notification unit 30a and the auditory notification unit 30b has been described as an example. However, there is no limitation thereto. For example, the notification unit 30 may be configured with only the visual notification unit 30a. Further, the notification unit 30 may be configured with only the auditory notification unit 30b.

Further, here, a case where the visual notification unit 30a is configured with the illuminating device 28a and the display device 28b has been described as an example. However, there is no limitation thereto. For example, the visual notification unit 30a may be configured with only the illuminating device 28a. Further, the visual notification unit 30a may be configured with only the display device 28b.

In this manner, the notification unit 30 includes the illuminating device 28a, the display device 28b, the sound device 28c, or a combination of them. The control section 16 controls the notification unit 30, thereby performing notification by illumination, display, sound, changes (alterations) in these, or a combination of them. In the change (the alteration) in the illumination, a change (an alteration) in a color of illumination, a change (an alteration) in a pattern of illumination, or the like is also included. In the change (the alteration) in the display, a change (an alteration) in a color of display, a change (an alteration) in a pattern of display, or the like is also included. In the change (the alteration) in the sound, a change (an alteration) in sound time, a sound period, or a sound pattern, or the like is also included.

The control section 16 outputs a control signal for controlling an opening and closing body driving device 32 to the opening and closing body driving device 32 through the output section 20. The opening and closing body driving device 32 is for driving the opening and closing body 34 which is a structural body having an opening and shutting mechanism. The control section 16 automatically performs an opening operation or the like of the opening and closing body 34 through the opening and closing body driving device 32. In the vehicle 36, a plurality of opening and closing bodies 34 are provided. However, in FIG. 1, one opening and closing body among the plurality of opening and closing bodies 34 is shown. In FIG. 2, among the plurality of opening and closing bodies 34, a side door 34a provided at a left front portion of the vehicle 36, a side door 34b provided at a left rear portion of the vehicle 36, and a back door 34c provided at a back portion of the vehicle 36 are shown. The side doors 34a and 34b are, for example, swinging doors. With respect to a side door 34 provided at a right front portion of the vehicle 36 and a side door 34 provided at a right rear portion of the vehicle 36, illustration thereof is omitted in FIG. 2.

Doorknobs 38a and 38b are respectively provided in the side doors 34a and 34b. A doorknob 38c is also provided in the back door 34c.

In addition, in FIG. 2, a case where the doorknobs 38a to 38c are respectively provided in the doors 34a to 34c has been described as an example. However, the doorknobs 38a to 38c may not be provided in the doors 34a to 34c. This is because in the vehicle control system according to this embodiment, it is possible to open the doors 34a to 34c without using the doorknobs 38a to 38c.

The operation detecting unit (an operation detection sensor) 24 is for detecting the intention of the occupant to try to operate the opening and closing body 34, based on a motion of the occupant, that is, an operation by a portion of the body of the occupant. For example, in a case where the occupant puts a hand on a site at which the operation detecting unit 24 is disposed, on the vehicle 36, it is assumed that the occupant has the intention to open the opening and closing body 34. Therefore, in a case where a portion of the body of the occupant is put on the site at which the operation detecting unit 24 is disposed, on the vehicle 36, the operation detecting unit 24 outputs an operation detection signal. As a portion of the body of the occupant which the operation detecting unit 24 can detect, the hand or the like of the occupant can be given as an example.

In addition, a portion of the body of the occupant which is required to be put on the site at which the operation detecting unit 24 is disposed is not limited to the hand. If a portion of the body of the occupant is simply put on the site at which the operation detecting unit 24 is disposed, the operation detecting unit 24 can output the operation detection signal. For example, even in a case where the elbow of the occupant is put on the site at which the operation detecting unit 24 is disposed, the operation detecting unit 24 can output the operation detection signal.

The vehicle control system according to this embodiment confirms an operation by a portion of the body of the occupant based on the operation by a portion of the body of the occupant having continued for a predetermined time and automatically opens the opening and closing body 34 to a desired degree of opening. After the opening and closing body 34 is automatically opened to the desired degree of opening, for example, the occupant manually further opens the opening and closing body 34. For this reason, it is preferable to set the site at which the operation detecting unit 24 is disposed, that is, an operating portion (an operating site), such that the occupant can smoothly transition to an act of manually further opening the opening and closing body 34 after the opening and closing body 34 is automatically opened to the desired degree of opening.

As a site at which an operation detecting unit 24a for operating the side door 34a is disposed, a pillar portion (a center pillar portion) 40a or the like of the side door 34a can be given as an example. Here, for example, the pillar portion 40a of the side door 34a has the built-in operation detecting unit 24a.

As a site at which an operation detecting unit 24b for operating the side door 34b is disposed, a pillar portion 40b or the like on the rear portion side of the side door 34b can be given as an example. Here, for example, the pillar portion 40b of the side door 34b has the built-in operation detecting unit 24b.

As a site at which an operation detecting unit 24c for operating the back door 34c is disposed, an emblem portion 42 or the like disposed at the back door 34c can be given as an example. Here, for example, the emblem portion 42 of the back door 34c has the built-in operation detecting unit 24c.

If the operation detecting units 24a to 24c are respectively disposed at such sites, the occupant can smoothly transition to an act of manually further opening the doors 34a to 34c after the doors 34a to 34c are automatically opened to the desired degree of opening.

For example, after the side door 34a is automatically opened to the desired degree of opening, the occupant can put a hand on the pillar portion 40a of the side door 34a and smoothly transition to an act of further opening the side door 34a.

Further, after the side door 34b is automatically opened to the desired degree of opening, the occupant can put a hand on the pillar portion 40b of the side door 34b and smoothly transition to an act of further opening the side door 34b.

Further, after the back door 34c is automatically opened to the desired degree of opening, the occupant can put a hand on a lower end portion of the back door 34c and smoothly transition to an act of further opening the back door 34c.

As described above, for example, the pillar portions 40a and 40b have the built-in operation detecting units 24a and 24b. Further, for example, the emblem portion 42 has the built-in operation detecting unit 24c. For this reason, the sites at which the operation detecting units 24a to 24c are disposed are not easily found from the external appearance of the vehicle 36. For this reason, the operation detection areas (measurement areas or detection ranges) 44 (refer to FIG. 3) which are areas in which the operation detecting units 24a to 24c can detect an operation by a portion of the body of the occupant are not easily found from the external appearance of the vehicle 36. For this reason, in this embodiment, the operation detection areas 44 of the operation detecting units 24a to 24c are shown (notified or informed) to the occupant using the visual notification unit 30a.

The visual notification unit 30a are disposed at the sites at which the operation detecting units 24a to 24c are disposed, or in the vicinity of the sites at which the operation detecting units 24a to 24c are disposed. As the visual notification unit 30a, the illuminating device 28a, the display device 28b, or a combination of them is used.

As sites at which the visual notification unit 30a for showing the occupant the operation detection areas 44 of the operation detecting units 24a and 24b are disposed, the pillar portions 40a and 40b or the like of the side doors 34a and 34b can be given as an example. Here, for example, the pillar portions 40a and 40b of the side doors 34a and 34b have the built-in visual notification unit 30a.

As a site at which the visual notification unit 30a for showing the occupant the operation detection area 44 of the operation detecting unit 24c is disposed, the emblem portion 42 or the like disposed at the back door 34c can be given as an example. Here, for example, the emblem portion 42 disposed at the back door 34c has the built-in visual notification unit 30a.

In a case where the pillar portions 40a and 40b of the side doors 34a and 34b have the built-in operation detecting units 24a and 24b, the operation detection areas 44 of the operation detecting units 24a and 24b become ranges as shown by a dashed line in FIG. 3. That is, a space of a certain range surrounding each of the pillar portions 40a and 40b, that is, a space of a certain range surrounding each of the operation detecting units 24a and 24b becomes the operation detection area 44 of each of the operation detecting units 24a and 24b.

In a case where the emblem portion 42 of the back door 34c has the built-in operation detecting unit 24c, the operation detection area 44 of the operation detecting unit 24c becomes a range as shown by a dashed line in FIG. 3. That is, a space of a certain range surrounding the emblem portion 42, that is, a space of a certain range surrounding the operation detecting unit 24c becomes the operation detection area 44 of the operation detecting unit 24c.

If the operation detection area 44 is too wide, erroneous detection becomes more prevalent, and if the operation detection area 44 is too narrow, operability decreases, and therefore, it is preferable to appropriately select an appropriate range in consideration of both the aspects of prevention of erroneous detection and improvement in operability.

Since the operation detection area 44 is a space of a certain range surrounding the operation detecting unit 24, it is difficult to visually show an exact range of the operation detection area 44 of the operation detecting unit 24 to the occupant. An approximate site of the operation detection area 44 of the operation detecting unit 24 can be shown to the occupant using the notification unit 30. For this reason, in this embodiment, whether or not there is a state where an operation by a portion of the body of the occupant has been detected by the operation detecting unit 24 is informed to the occupant using the notification unit 30 (answer back).

The control section 16 determines whether or not there is a state where an operation by a portion of the body of the occupant has been detected by the operation detecting unit 24, based on the operation detection signal from the operation detecting unit 24. Then, when the operation detection signal from the operation detecting unit 24 has been input through the input section 14, the control section 16 informs the occupant that there is a state where an operation by a portion of the body of the occupant has been detected by the operation detecting unit 24, using the notification unit 30. The occupant can reliably recognize whether or not there is a state where an operation by a portion of the body of the occupant has been detected by the operation detecting unit 24, by the notification unit 30.

As the notification unit 30 for informing the occupant that there is a state where an operation by a portion of the body of the occupant has been detected by the operation detecting unit 24, it is possible to use, for example, the visual notification unit 30a described above. Further, as the notification unit 30 for informing the occupant that there is a state where an operation by a portion of the body of the occupant has been detected by the operation detecting unit 24, it is also possible to use the auditory notification unit 30b.

As the site at which the auditory notification unit 30b for informing the occupant that there is a state where an operation has been detected by the built-in operation detecting units 24a and 24b of the pillar portions 40a and 40b of the side doors 34a and 34b is disposed, the pillar portions 40a and 40b or the like can be given as an example. Here, for example, each of the pillar portions 40a and 40b of the side doors 34a and 34b has the built-in auditory notification unit 30b.

As the site at which the auditory notification unit 30b for informing the occupant that there is a state where an operation has been detected by the built-in operation detecting unit 24c of the emblem portion 42 of the back door 34c is disposed, the emblem portion 42 or the like of the back door 34c can be given as an example. Here, the emblem portion 42 disposed at the back door 34c has the built-in auditory notification unit 30b.

As described above, in this embodiment, the operation detection areas 44 of the operation detecting units 24a to 24c are shown to the occupant using the visual notification unit 30a. However, it is not always necessary to perform notification of the operation detection area 44 of the operation detecting unit 24 by the visual notification unit 30a. In a case where a configuration is made such that notification of the operation detection area 44 of the operation detecting unit 24 is always performed using the visual notification unit 30a, the external appearance of the vehicle 36 is impaired. Therefore, when it is necessary to show the occupant the operation detection area 44 of the operation detecting unit 24, it is favorable to perform notification by the notification unit 30. When the occupant has come close to the vehicle, there is a possibility that the occupant may perform an operation for operating the opening and closing body 34. Therefore, in this embodiment, a configuration is made such that when the occupant has come close to the vehicle 36, the position of the operation detection area 44 of the operation detecting unit 24 is shown to the occupant using the notification unit 30.

When the occupant passes the side of the vehicle 36, the operation detecting unit 24 detects a portion of the body of the occupant and an operation detection signal is input from the operation detecting unit 24 through the input section 14. In such a case, when the opening and closing body 34 has been immediately operated, even though the occupant does not intend to operate the opening and closing body 34, the opening and closing body 34 is operated. In order to prevent such an erroneous operation of the opening and closing body 34, in this embodiment, the operation is confirmed based on an operation by a portion of the body of the occupant having continued for a predetermined time. If an operation by a portion of the body of the occupant has not continued for a predetermined time, the operation is not confirmed and thus the opening and closing body 34 is not operated, and therefore, the opening and closing body 34 can be prevented from being operated when the occupant does not intend to operate it.

For example, the proximity detection unit 26 wirelessly performs communication between itself and the smart key 46. In a case where the distance from the vehicle 36 to the smart key 46 has become less than or equal to a predetermined distance, it can be determined that the occupant carrying the smart key 46 has come close to the vehicle 36. The proximity detection unit 26 outputs a proximity detection signal in a case where the distance from the vehicle 36 to the smart key 46 has become less than or equal to a predetermined distance.

Next, an operation of the vehicle control system according to this embodiment will be described with reference to the drawings. FIGS. 4 to 7 are perspective views showing an operation of the vehicle control system according to this embodiment.

A state before the occupant comes close to the vehicle 36 is as shown in FIG. 2. Since the occupant has not come close to the vehicle 36, a proximity detection signal is never input from the proximity detection unit 26 to the input section 14. In this stage, informing the occupant of the operation detection area 44 of the operation detecting unit 24 is not required. For this reason, in this stage, the control section 16 does not drive the notification unit 30.

Figure 4:
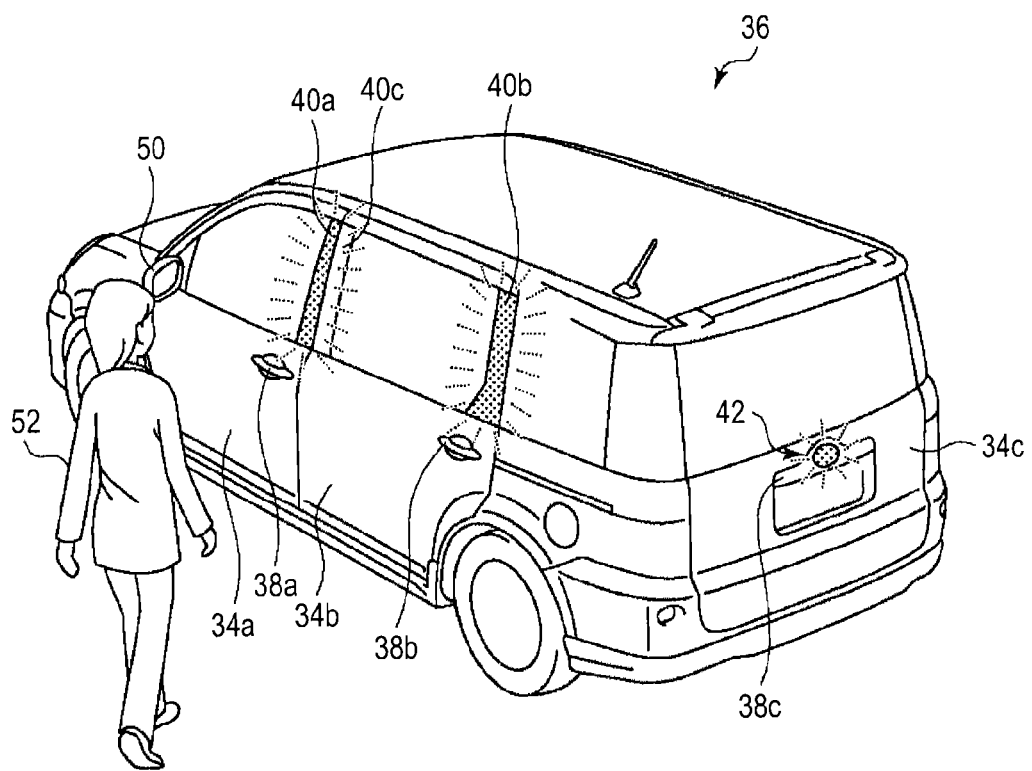
FIG. 4 is a perspective view (Part 1) showing an operation of the vehicle control system according to the embodiment.

FIG. 4 is a perspective view showing a state where an occupant 52 has come close to the vehicle 36. If the occupant 52 is located in the communication area 48 of the smart key system, a proximity detection signal is input from the proximity detection unit 26 to the input section 14. The control section 16 performs notification using the notification unit 30 in order to show the occupant the operation detection area 44 of the operation detecting unit 24. For example, the control section 16 shows the occupant the operation detection area 44 of the operation detecting unit 24 using the visual notification unit 30a.

In a case where the pillar portions 40a and 40b of the side doors 34a and 34b have the built-in operation detecting units 24a and 24b and the built-in illuminating devices 28a, the control section 16 performs notification using the illuminating devices 28a. Further, in a case where the emblem portion 42 of the back door 34c has the built-in operation detecting unit 24c and the built-in illuminating device 28a, the control section 16 performs notification using the illuminating device 28a. For example, the control section 16 shows the occupant 52 the operation detection area 44 by making the respective illuminating devices 28a emit light with a relatively small amount of light. The occupant 52 can grasp an approximate location of the operation detection area 44 by the guidance by the notification unit 30.

Figure 5:
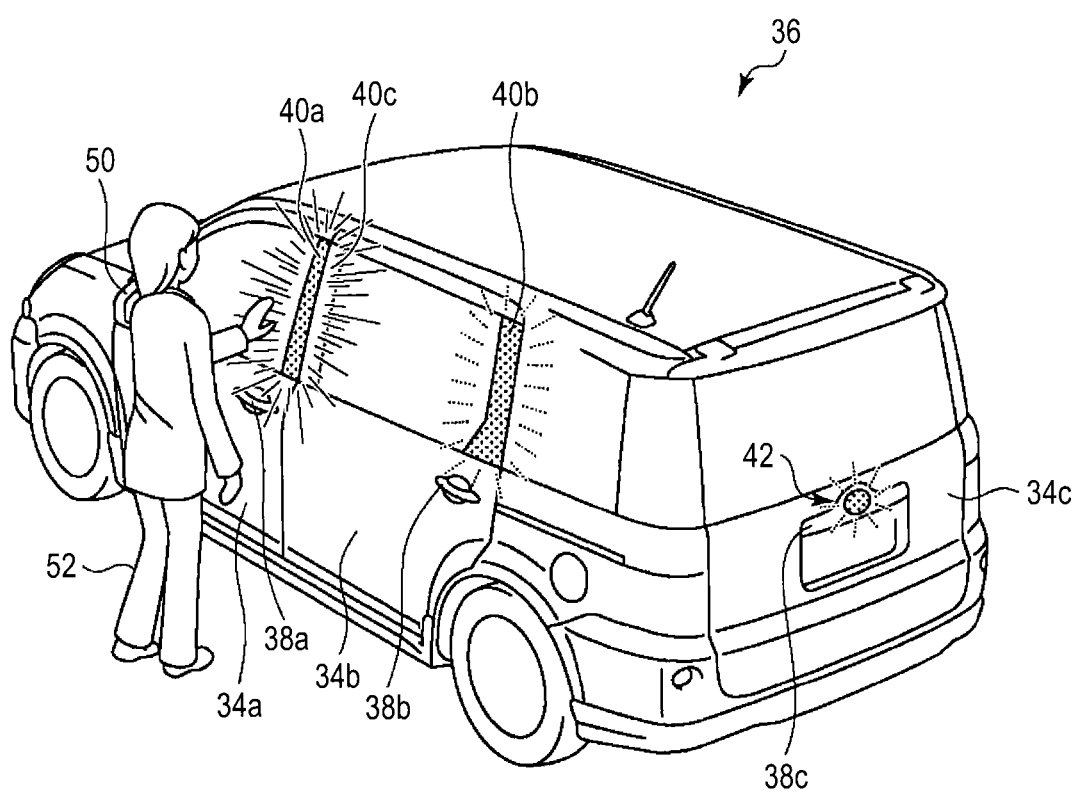
FIG. 5 is a perspective view (Part 2) showing the operation of the vehicle control system according to the embodiment.

FIG. 5 is a perspective view showing a state where the occupant 52 is performing an operation by a portion of the body. Here, a case of operating the side door 34a of the left front portion will be described as an example. In a case of operating the side door 34a of the left front portion, the occupant 52 puts a portion of the body on the pillar portion 40a of the side door 34a. In a case where a portion of the body of the occupant 52 is located in the operation detection area 44 of the operation detecting unit 24a, an operation detection signal is output from the operation detecting unit 24a. When the operation detection signal from the operation detecting unit 24a is input through the input section 14, the control section 16 drives the notification unit 30. For example, the control section 16 makes the built-in illuminating device 28a of the pillar portion 40a emit light with a relatively large amount of light, thereby informing the occupant 52 that there is a state where an operation by a portion of the body of the occupant 52 has been detected by the operation detecting unit 24a. In the state shown in FIG. 5, in the built-in operation detecting unit 24b of the pillar portion 40b of the side door 34b, an operation by a portion of the body of the occupant 52 is not detected. For this reason, the control section 16 maintains a state of making the built-in illuminating device 28a of the pillar portion 40b emit light with a relatively small amount of light. Further, in the state shown in FIG. 5, also in the built-in operation detecting unit 24c of the emblem portion 42, an operation by a portion of the body of the occupant 52 is not detected. For this reason, the control section 16 maintains a state of making the built-in illuminating device 28a of the emblem portion 42 emit light with a relatively small amount of light.

Figure 6:
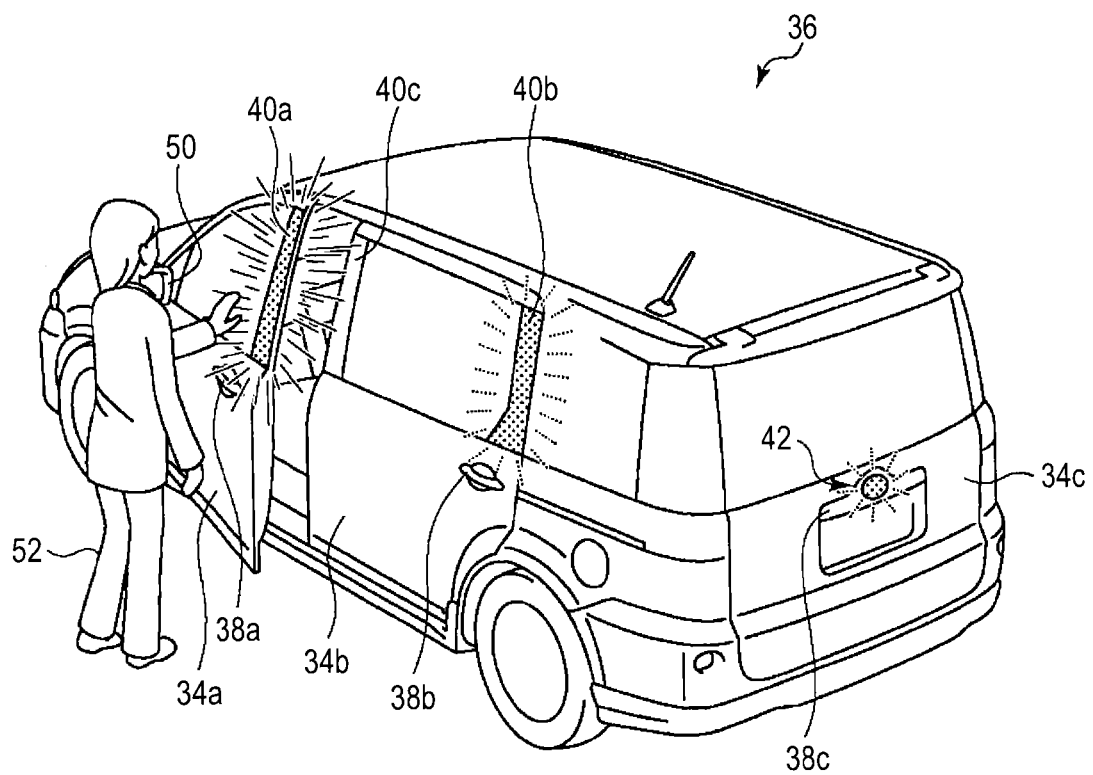
FIG. 6 is a perspective view (Part 3) showing the operation of the vehicle control system according to the embodiment.

If an operation by a portion of the body of the occupant 52 is continued for a predetermined time, the control section 16 confirms the operation and automatically opens the opening and closing body 34 to a desired degree of opening. FIG. 6 is a perspective view showing a state where the side door 34a has been opened to the desired degree of opening.

Figure 7:
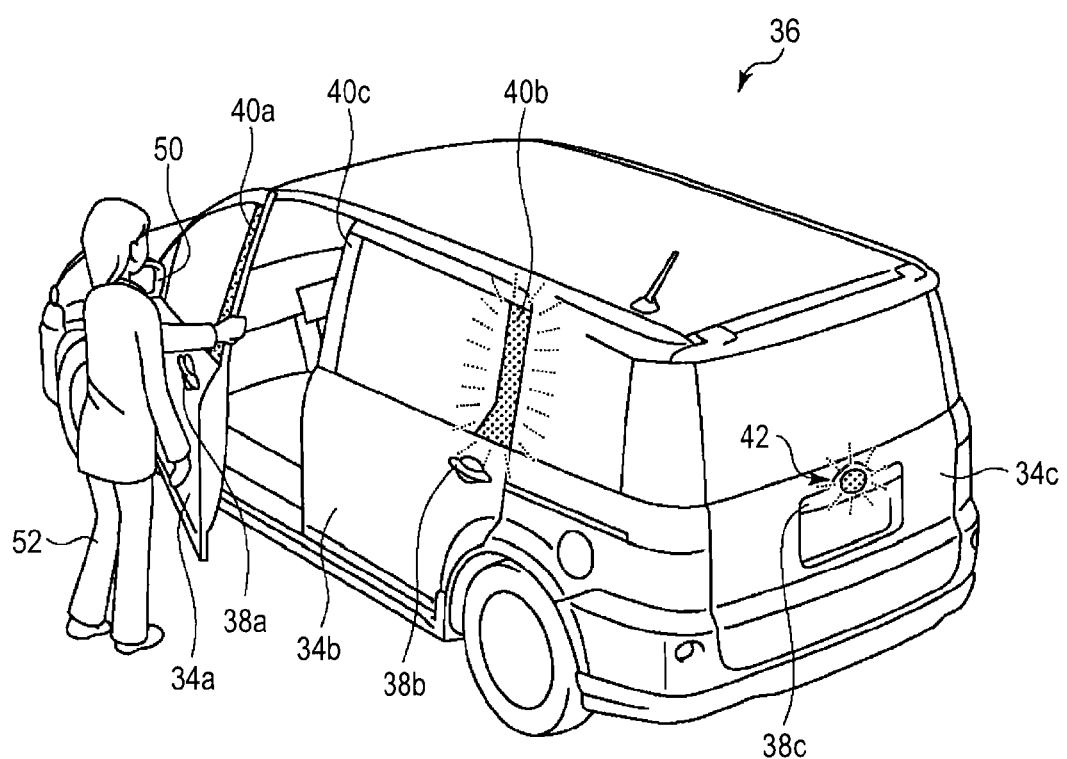
FIG. 7 is a perspective view (Part 4) showing the operation of the vehicle control system according to the embodiment.

After the opening and closing body 34 is automatically opened to the desired degree of opening, the occupant 52 manually further opens the opening and closing body 34. FIG. 7 is a perspective view showing a state where the occupant 52 manually further opens the side door 34a. Thereafter, the occupant 52 can get in the vehicle 36.

Figure 8:
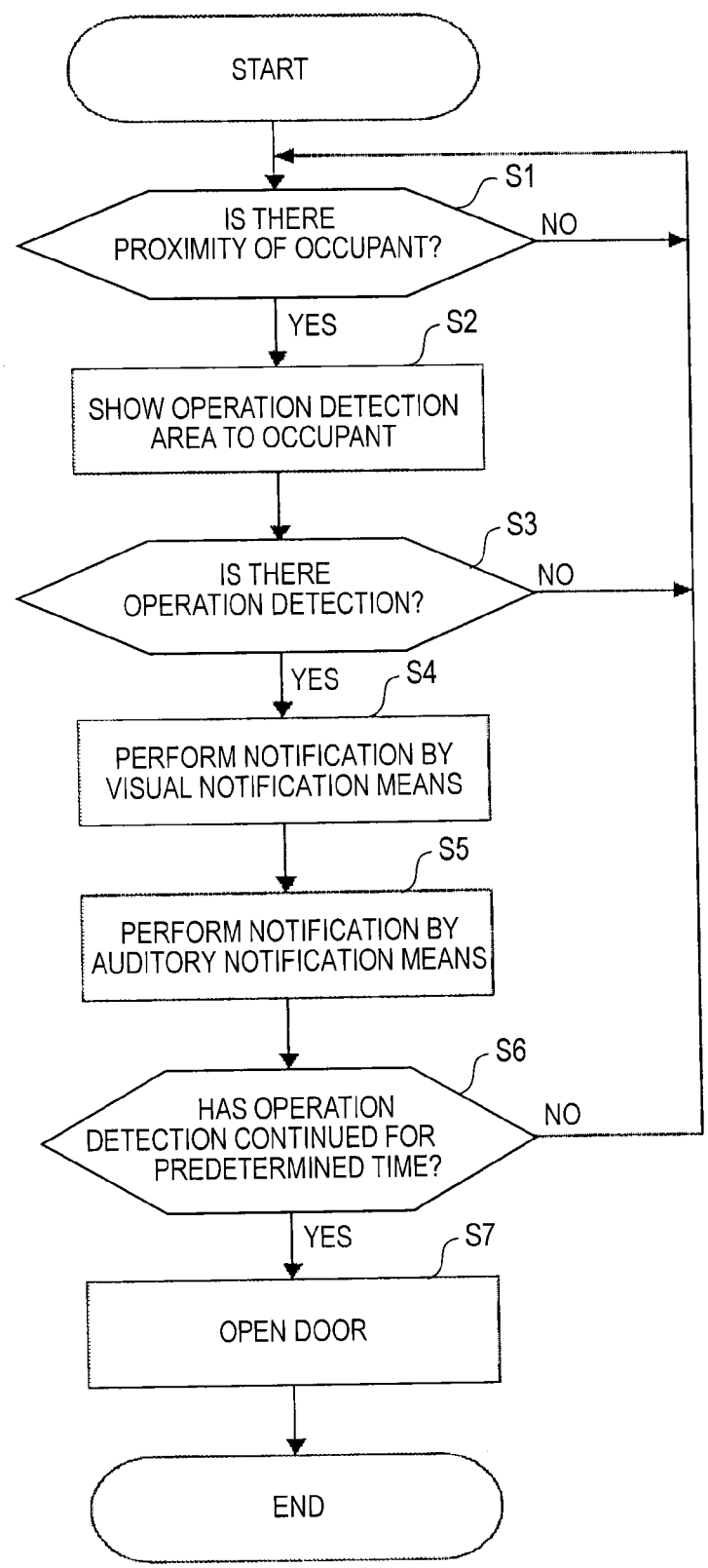
FIG. 8 is a flowchart showing a vehicle control method according to the embodiment.

Next, a vehicle control method according to this embodiment will be described using FIG. 8. FIG. 8 is a flowchart showing the vehicle control method according to this embodiment.

First, the control section 16 of the control device 12 determines the presence or absence of the proximity of the occupant 52 to the vehicle 36 (step S1). The presence or absence of the proximity of the occupant 52 to the vehicle 36 can be determined based on, for example, whether the smart key 46 is located in the communication area 48 of the smart key system. In a case where the smart key 46 is located in the communication area 48, it can be determined that the occupant 52 carrying the smart key 46 is in close proximity to the vehicle 36. When the smart key 46 is located in the communication area 48, a proximity detection signal is output from the proximity detection unit 26. The control section 16 determines the presence or absence of the proximity of the occupant 52 to the vehicle 36 based on the presence or absence of the proximity detection signal from the proximity detection unit 26.

Next, in a case where the occupant 52 is in close proximity to the vehicle 36, the operation detection area 44 of the operation detecting unit 24 is shown to the occupant using the notification unit 30 (step S2). In a case where the pillar portions 40a and 40b of the side doors 34a and 34b have the built-in operation detecting units 24a and 24b and the built-in illuminating devices 28a, the control section 16 performs illumination using the illuminating devices 28a, thereby showing the occupant 52 the operation detection areas 44 of the operation detecting units 24a and 24b. Further, in a case where the emblem portion 42 of the back door 34c has the built-in operation detecting unit 24c and the built-in illuminating device 28a, the control section 16 performs illumination using the illuminating device 28a, thereby showing the occupant 52 the operation detection area 44 of the operation detecting unit 24c. For example, the control section 16 shows the occupant 52 the operation detection areas 44 of the operation detecting units 24a to 24c by making the respective illuminating devices 28a emit light with a relatively small amount of light. The occupant 52 can grasp an approximate location of the operation detection area 44 by the guidance by the notification unit 30.

In addition, in a case where the occupant 52 is not in close proximity to the vehicle 36, step S1 is repeated.

Next, in a case where an operation by a portion of the body of the occupant 52 has been detected by the operation detecting unit 24 (step S3), the control section 16 informs the occupant 52 that there is a state where the operation has been detected by the operation detecting unit 24, using the visual notification unit 30a (step S4). Here, a case where an operation by a portion of the body of the occupant 52 has been detected in the built-in operation detecting unit 24a of the pillar portion 40a of the side door 34a will be described as an example. That is, in a case where an operation by a portion of the body of the occupant 52 has been detected in the built-in operation detecting unit 24a of the pillar portion 40a of the side door 34a, the operation detection signal from the operation detecting unit 24a is input through the input section 14. In this case, the control section 16 informs the occupant that there is a state where the operation has been detected, using the built-in visual notification unit 30a of the pillar portion 40a of the side door 34a. For example, the control section 16 makes the built-in illuminating device 28a of the pillar portion 40a of the side door 34a emit light with a relatively large amount of light, thereby informing the occupant that there is a state where the operation has been detected by the operation detecting unit 24a. On the other hand, in the built-in operation detecting unit 24b of the pillar portion 40b of the side door 34b, since the occupant 52 has not performed an operation, an operation by a portion of the body of the occupant 52 is not detected. For this reason, the control section 16 maintains a state of making the built-in illuminating device 28a of the pillar portion 40b of the side door 34b emit light with a relatively small amount of light. Further, also in the built-in operation detecting unit 24c of the emblem portion 42, since the occupant 52 has not performed an operation, an operation by a portion of the body of the occupant 52 is not detected. For this reason, the control section 16 maintains a state of making the built-in illuminating device 28a of the emblem portion 42 emit light with a relatively small amount of light.

Next, the control section 16 informs the occupant 52 that there is a state where an operation by a portion of the body of the occupant 52 has been detected by the operation detecting unit 24, using the auditory notification unit 30b (step S5). That is, the control section 16 informs the occupant 52 that there is a state where the operation has been detected, using the built-in auditory notification unit 30b of the pillar portion 40a of the side door 34a. For example, the control section 16 informs the occupant 52 that there is a state where the operation has been detected by the operation detecting unit 24a, by causing the built-in sound device 28c of the pillar portion 40a of the side door 34a to emit sound. On the other hand, in the built-in operation detecting unit 24b of the pillar portion 40b of the side door 34b, since the occupant 52 has not performed an operation, an operation by a portion of the body of the occupant 52 is not detected. For this reason, the control section 16 does not cause the built-in sound device 28c of the pillar portion 40b of the side door 34b to emit sound. Further, also in the built-in operation detecting unit 24c of the emblem portion 42, since the occupant 52 has not performed an operation, an operation by a portion of the body of the occupant 52 is not detected. For this reason, the control section 16 does not cause the built-in sound device 28c of the emblem portion 42 to emit sound.

In addition, in step S3, in a case where an operation by a portion of the body of the occupant 52 has not been detected by the operation detecting unit 24, the routine returns to step S1.

In a case where the detection of the operation by a portion of the body of the occupant 52 has continued for a predetermined time (step S6), the control section 16 confirms the operation and operates the opening and closing body 34 (step S7). Here, a case where the operation by a portion of the body of the occupant 52 has been detected in the built-in operation detecting unit 24a of the pillar portion 40a of the side door 34a will be described as an example. That is, in a case where the detection of the operation has continued for a predetermined time, it can be determined that the occupant 52 intends to operate the opening and closing body 34. Such a predetermined time can be set to be in a range of 1 second to 3 seconds, for example. In a case where the detection of the operation has continued for the predetermined time, the control section 16 confirms the operation and automatically opens the side door 34a to a desired degree of opening (pop-up). When opening the side door 34a, the side door 34a is opened in a range of 10 cm to 15 cm, for example.

In addition, in step S6, in a case where the detection of the operation by a portion of the body of the occupant 52 has not continued for the predetermined time or more, the routine returns to step S1. This is because in a case where the detection of the operation has not continued for the predetermined time or more, it can be determined that the occupant 52 does not want to operate the opening and closing body 34. For example, in a case where the occupant 52 simply passes the side of the vehicle 36, the detection of an operation by the operation detecting unit 24 does not continue for the predetermined time or more. Therefore, the control section 16 never mistakenly opens the opening and closing body 34.

In this manner, according to this embodiment, when there is a state where an operation by the occupant 52 has been detected by the operation detecting unit 24, notification using the notification unit 30 is performed to the occupant. For this reason, the occupant 52 can reliably recognize whether or not a portion of the body of the occupant 52 is located in the operation detection area of the operation detecting unit 24. For this reason, the occupant 52 maintains the state until a predetermined time which is necessary to confirm an operation elapses, and can reliably operate the opening and closing body 34. Therefore, according to this embodiment, it is possible to improve operability when operating the opening and closing body 34 by an operation by a portion of the body of the occupant 52.

Modification Embodiments

Various modifications can be made without being limited to the embodiment described above.

For example, in the embodiment described above, a case of using a capacitance type proximity sensor as the operation detecting unit 24 has been described as an example. However, the operation detecting unit 24 is not limited to the capacitance type proximity sensor. For example, an Infrared sensor, an ultrasonic sensor, a radiofrequency sensor, or the like may be used as the operation detecting unit 24.

Figure 9:
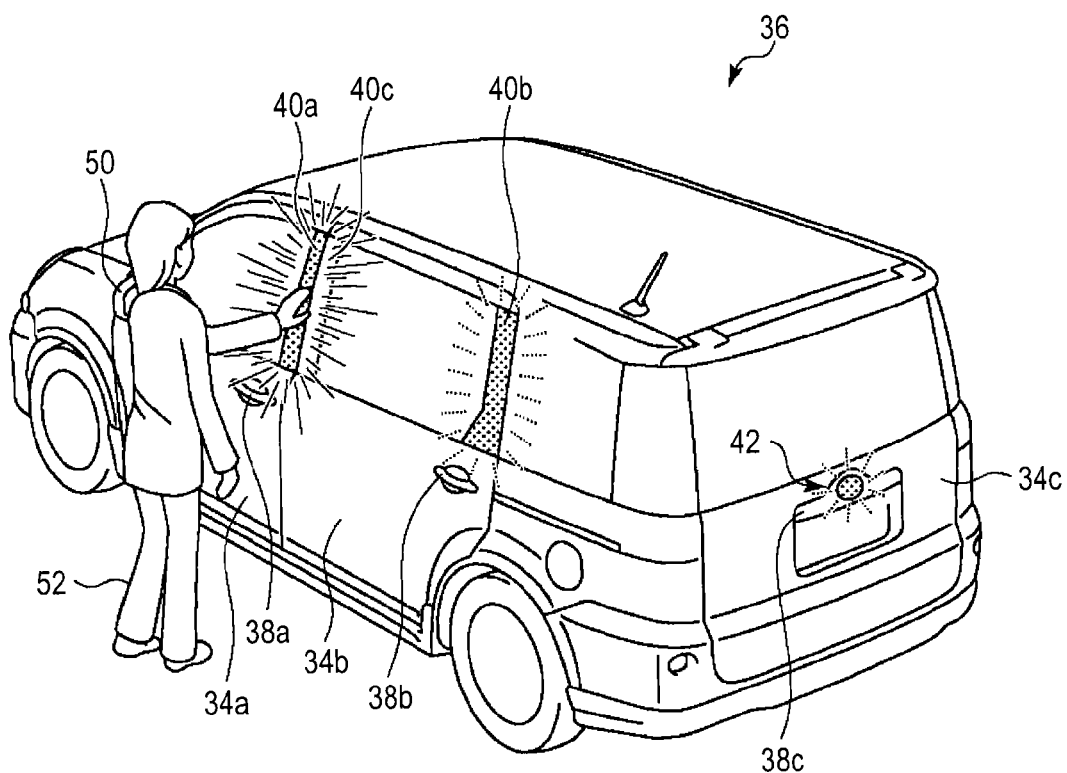
FIG. 9 is a perspective view showing an operation of a vehicle control system according to a modified example.

Further, in the embodiment described above, a case of detecting a non-contact operation by a portion of the body of the occupant 52 has been described as an example. However, there is no limitation to non-contact. For example, when a portion of the body of the occupant 52 has come into contact with the site at which the operation detecting unit 24 is disposed, the operation may be detected. FIG. 9 is a perspective view showing an operation of a vehicle control system according to a modified example. FIG. 9 shows a state where a portion of the body of the occupant 52 is in contact with the site at which the operation detecting unit 24 is disposed. The operation detecting units 24a and 24b are provided in the pillar portions 40a and 40b of the side doors 34a and 34b. Further, the operation detecting unit 24c is provided in the emblem portion 42 of the back door 34c. As the operation detecting units 24a to 24c, for example, a contact type sensor is used. As such a contact type sensor, for example, a mechanical switch, a membrane switch, a capacitance sensor, a piezoelectric sensor, or the like can be used. When a portion of the body of the occupant 52 is in contact with the operation detecting unit 24, the operation detection signal from the operation detecting unit 24 is input through the input section 14. When an operation by a portion of the body of the occupant 52 has been detected by the operation detecting unit 24, the control section 16 informs the occupant 52 that there is a state where the operation has been detected by the operation detecting unit 24, using the notification unit 30. Also in this modified example, the occupant 52 can reliably grasp whether or not there is a state where an operation by a portion of the body of the occupant 52 has been detected by the operation detecting unit 24.

Further, in the embodiment described above, a receiving unit capable of receiving the radio signal from the smart key 46 has been used as the proximity detection unit 26. However, the proximity detection unit 26 is not limited thereto. For example, an ultrasonic sensor, a microwave sensor, a light sensor, or the like can also be used as the proximity detection unit 26. Further, for example, by determining the movement of the frame of a human being, the face of a human being, or the like, it is also possible to detect the proximity of the occupant 52 to the vehicle 36. The discrimination of the movement of the frame of a human being, the face of a human being, or the like can be performed using a technique capable of three-dimensionally measuring the frame of a human being by, for example, a camera, an infrared sensor, an ultrasonic sensor, or the like. As such a technique, Kinect (registered trademark) which is input terminal equipment that is used in the game terminal Xbox 360 (registered trademark) of Microsoft Corporation in the United States, or the like can be given as an example. A unit for performing the discrimination of the movement of the frame of a human being or the face of a human being, or the like, is not limited to Kinect (registered trademark). In a case of using a Kinect (registered trademark) sensor, the sensor can be mounted on, for example, a side mirror portion 50, or the like. In this manner, it is possible to appropriately use various units capable of detecting the proximity of the occupant 52 to the vehicle 36 as the proximity detection unit 26.

Further, in the embodiment described above, when the proximity of the occupant 52 to the vehicle 36 has been detected, illumination is performed with a relatively small amount of light by the illuminating device 28a, and when an operation by a portion of the body of the occupant 52 has been detected, illumination is performed with a relatively large amount of light by the illuminating device 28a. That is, an aspect of the illumination of the illuminating device 28a when the proximity of the occupant 52 to the vehicle 36 has been detected and an aspect of the illumination of the illuminating device 28a when an operation by a portion of the body of the occupant 52 has been detected are made to be different from each other. However, an aspect when performing notification is not limited thereto. Notification by the notification unit 30 may be appropriately performed by illumination, display, sound, changes in these, or a combination of them.

Further, in the embodiment described above, a case where the illuminating device 28a is incorporated into the pillar portions 40a and 40b or the emblem portion 42 has been described as an example. However, there is no limitation thereto. For example, an interior light provided in the vehicle 36 may also serve as the illuminating device 28a configuring the visual notification unit 30a. Further, an illuminating lamp which illuminates a number plate mounted on the back door 34c may also serve as the illuminating device 28a configuring the visual notification unit 30a. Further, a brake lamp, a hazard lamp, or the like may also serve as the illuminating device 28a configuring the visual notification unit 30a.

Further, in the embodiment described above, a case of operating the side door 34a of the left front portion has been described as an example. However, there is no limitation thereto. The side door 34*b* of the left rear portion, the side door 34 of the right front portion, the side door 34 of the right rear portion, or the back door 34*c* can also be operated in the same manner as described above.

Further, in the embodiment described above, a case where the pillar portions 40*a* and 40*b* of the side doors 34*a* and 34*b* have the built-in operation detecting units 24*a* and 24*b* has been described as an example. However, there is no limitation thereto. For example, the operation detecting units 24*a* and 24*b* may be provided in belt molding portions of the side doors 34*a* and 34*b*, at sites in the vicinity of the belt molding portions, or the like. Further, the operation detecting units 24*a* and 24*b* may be provided in the doorknobs 38*a* and 38*b* of the side doors 34*a* and 34*b*, at sites in the vicinity of the doorknobs 38*a* and 38*b*, or the like. The operation detecting units 24*a* and 24*b* may also be provided at arbitrary sites on the side doors 34*a* and 34*b*.

Further, in the embodiment described above, a case where the emblem portion 42 of the back door 34*c* has the built-in operation detecting unit 24*c* has been described as an example. However, there is no limitation thereto. For example, the operation detecting unit 24*c* may be provided at a site in the vicinity of the lower end portion of the back door 34*c*, or the like. The operation detecting unit 24*c* may also be provided at an arbitrary site on the back door 34*c*. The operation detecting unit 24*c* may also be provided in a trim portion of the back door 34*c*.

Further, in the embodiment described above, a case where the notification by the auditory notification unit 30*b* (step S5) is performed after the notification by the visual notification unit 30*a* (step S4) is performed has been described as an example. However, there is no limitation thereto. For example, after the notification by the visual notification unit 30*a* (step S4) is performed, the routine may proceed to step S6 without performing the notification by the auditory notification unit 30*b* (step S5). Further, a configuration may be made such that the notification by the auditory notification unit 30*b* (step S5) is performed without performing the notification by the visual notification unit 30*a* (step S4) and thereafter, the routine proceeds to step S6.

Further, in the embodiment described above, a case where all the operation detection areas 44 are shown to the occupant when the occupant 52 is located in the communication area 48 of the smart key system has been described as an example. However, there is no limitation thereto. That is, a case where all the illuminating devices 28*a* emit light when the occupant 52 is located in the communication area 48 of the smart key system has been described as an example. However, there is no limitation thereto. For example, a configuration may be made such that the position of the occupant 52 is detected using a sensor or the like and only the operation detection area 44 which is located near the occupant 52 is shown to the occupant 52. For example, in a case where the occupant 52 is located at the left front portion of the vehicle 36, only the built-in illuminating device 28*a* of the pillar portion 40*a* of the side door 34*a* of the left front portion may emit light.

An aspect of this disclosure is directed to a control device including: an input section to which a first signal indicating the presence or absence of an operation for operating an opening and closing body of a vehicle which is performed using a portion of the body of an occupant is input from an operation detecting unit; and a control section which performs notification to the occupant using a notification unit when there is a state where the operation has been detected by the operation detecting unit, based on the first signal, and performs control for operating the opening and closing body, based on the operation.

In the control device according to the aspect of this disclosure, a second signal indicating the presence or absence of proximity of the occupant to the vehicle may further be input from a proximity detection unit to the input section, and the control section may show the occupant an operation detection area of the operation detecting unit using the notification unit or another notification unit, based on the second signal.

In the control device according to the aspect of this disclosure, the notification unit may include an illuminating device, a display device, a sound device, or a combination of them, and the notification unit may perform the notification by illumination, display, sound, changes in these, or a combination of them.

In the control device according to the aspect of this disclosure, the control section may confirm the operation in a case where the operation has continued for a predetermined time.

Another aspect of this disclosure is directed to a vehicle control system including: an operation detecting unit configured to detect an operation for operating an opening and closing body of a vehicle which is performed using a portion of the body of an occupant; a notification unit configured to perform notification to the occupant; and a control device which performs notification to the occupant using the notification unit when there is a state where the operation has been detected by the operation detecting unit, based on a first signal from the operation detecting unit, and operates the opening and closing body based on the operation.

In the vehicle control system according to the aspect of this disclosure, the vehicle control system may further include: a proximity detection unit configured to detect proximity of the occupant to the vehicle, and the control device may show the occupant an operation detection area of the operation detecting unit using the notification unit or another notification unit, based on a second signal from the proximity detection unit.

In the vehicle control system according to the aspect of this disclosure, the notification unit may include an illuminating device, a display device, a sound device, or a combination of them, and the notification unit may perform the notification by illumination, display, sound, changes in these, or a combination of them.

According to the aspects of this disclosure, when there is a state where an operation by the occupant has been detected by the operation detecting unit, notification using the notification unit is performed to the occupant. For this reason, the occupant can reliably recognize whether or not a portion of the body is located in an operation detection area of the operation detecting unit. For this reason, the occupant maintains the state until a predetermined time which is necessary to confirm an operation elapses, and can reliably operate the opening and closing body. Therefore, according to this disclosure, it is possible to improve operability when operating the opening and closing body by an operation by a portion of the body of the occupant.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control device comprising:
an input section to which a first signal indicating the presence or absence of an operation for operating an opening and closing body of a vehicle which is performed using a portion of the body of an occupant is input from an operation detecting unit; and
a control section which performs notification to the occupant using a notification unit when there is a state where the operation has been detected by the operation detecting unit, based on the first signal, and performs control for operating the opening and closing body, based on the operation,
wherein a second signal indicating the presence or absence of proximity of the occupant to the vehicle is further input from a proximity detection unit to the input section, and
the control section shows the occupant an operation detection area of the operation detecting unit using the notification unit or another notification unit, based on the second signal.

2. The control device according to claim 1, wherein the notification unit includes an illuminating device, a display device, a sound device, or a combination of them, and
the notification unit performs the notification by illumination, display, sound, changes in these, or a combination of them.

3. The control device according to claim 1, wherein the control section confirms the operation in a case where the operation has continued for a predetermined time.

4. A vehicle control system comprising:
an operation detecting unit configured to detect an operation for operating an opening and closing body of a vehicle which is performed using a portion of the body of an occupant;
a notification unit configured to perform notification to the occupant;
a proximity detection unit for detecting proximity of the occupant to the vehicle;
and
a control device which performs notification to the occupant using the notification unit when there is a state where the operation has been detected by the operation detecting unit, based on a first signal from the operation detecting unit, and operates the opening and closing body based on the operation,
wherein the control device shows the occupant an operation detection area of the operation detecting unit using the notification unit or another notification unit, based on a second signal from the proximity detection unit.

5. The vehicle control system according to claim 4, wherein the notification unit includes an illuminating device, a display device, a sound device, or a combination of them, and
the notification unit performs the notification by illumination, display, sound, changes in these, or a combination of them.

6. The control device according to claim 1, wherein the notification unit is a auditory notification unit and the control section shows the occupant the operation detection area using the another notification unit which is a visual notification unit.

7. The control device according to claim 6, wherein the visual notification unit includes an illumination unit.

8. The control device according to claim 7, wherein the illumination unit is in a pillar of the vehicle adjacent to the opening and closing body.

* * * * *